(12) United States Patent
Tanaya (10) Patent No.: US 8,490,468 B2
(45) Date of Patent: Jul. 23, 2013

(54) FAILURE DIAGNOSIS SYSTEM

(75) Inventor: Kimihiko Tanaya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 213 days.

(21) Appl. No.: 13/165,378

(22) Filed: Jun. 21, 2011

(65) Prior Publication Data

US 2012/0073362 A1      Mar. 29, 2012

(30) Foreign Application Priority Data

Sep. 24, 2010   (JP) .................................. 2010-213420

(51) Int. Cl.
*G01M 15/00* (2006.01)

(52) U.S. Cl.
USPC .................. 73/35.03; 73/35.08; 73/114.77

(58) Field of Classification Search
USPC .......... 73/35.01, 35.03, 35.06, 35.07, 114.02, 73/114.03, 114.04, 114.08, 114.13, 114.24, 73/114.25, 114.26, 114.77
See application file for complete search history.

(56) References Cited

U.S. PATENT DOCUMENTS

| | | | |
|---|---|---|---|
| 4,821,194 A * | 4/1989 | Kawamura ..................... | 701/111 |
| 5,243,854 A * | 9/1993 | Ishida ......................... | 73/114.34 |
| 7,263,427 B2 * | 8/2007 | Hasegawa et al. ............ | 701/107 |
| 7,542,865 B2 * | 6/2009 | Hoshi et al. .................. | 702/106 |
| 7,552,615 B2 * | 6/2009 | Kuwata et al. ................ | 73/1.75 |

FOREIGN PATENT DOCUMENTS

| | | |
|---|---|---|
| JP | 02-301646 A | 12/1990 |
| JP | 04-143440 A | 5/1992 |
| JP | 2003-286888 A | 10/2003 |
| JP | 2008-248831 A | 10/2008 |
| JP | 2009-097501 A | 5/2009 |

* cited by examiner

*Primary Examiner* — Eric S McCall
(74) *Attorney, Agent, or Firm* — Sughrue Mion, PLLC (57) ABSTRACT

Provided is a failure diagnosis system which can diagnose whether or not a sensitivity adjustment part is in failure. The failure diagnosis system includes: a plurality of sensors; various sensors that detect operating conditions of a device; a plurality of sensitivity adjustment parts that adjust receiver sensitivities of sensor signals from the plurality of sensors based on the detected operating conditions; and a failure diagnosis part that diagnoses whether or not the plurality of sensitivity adjustment parts are in failure. The failure diagnosis part detects a failure condition of a sensitivity adjustment part when a difference between a comparison value calculated based on a maximum value of the adjusted sensor signals from the plurality of sensitivity adjustment parts at a given interval, and a maximum value of the adjusted sensor signal from the sensitivity adjustment part to be diagnosed at the given interval is larger than a given amount.

12 Claims, 5 Drawing Sheets

FAILURE DIAGNOSIS SYSTEM

BACKGROUND OF THE INVENTION

1. Field of the Invention

The present invention relates to a failure diagnosis system that diagnoses whether or not a sensitivity adjustment part for adjusting a receiver sensitivity (conversion rate) of an input signal is in failure.

2. Description of the Related Art

In recent years, in response to an increasing demand for environmental protection and a problem about fuel depletion, it has been imperative to cope with such a situation also in the automotive industry. Under the circumstances, there have been proposed, as the countermeasure, for example, many technologies by which the efficiency of an internal combustion engine is to be enhanced to the utmost extent.

One of those technologies is that the efficiency of the internal combustion engine is maximized by subjecting, while detecting a combustion condition of the internal combustion engine, the internal combustion engine to feedback control according to the detected combustion condition. As a measure for detecting the combustion condition of the internal combustion engine, there has been generally known a technology in which ions generated by combustion of combustible gas mixture are detected as an ion current by an ion sensor, and it is determined whether or not the internal combustion engine is in the combustion condition, based on the detected ion current.

In this technology, the ion current very delicately changes according to a change in combustion condition of the internal combustion engine and various environments, and the change amount of a signal is large. Accordingly, in a signal processing device that retrieves an ion current signal into a microcomputer, for example, through an analog to digital (A/D) converter, and digitally processes the ion current signal, there arise such problems that a large signal is lost by the limit of a dynamic range of the A/D converter, a small signal is lost by the limit of a resolution of the A/D converter, and a fine change is not captured.

Under the circumstances, in order to solve the above-mentioned problems, there has been known provision of a sensitivity adjustment part for converting the signal to an appropriate magnitude in an interface part for retrieving the ion current signal in the signal processing device. In general, the sensitivity adjustment part is provided not only in the signal processing device for processing the ion current signal, but also in other signal processing devices in the same manner.

As the sensitivity adjustment part for converting the ion current signal to the appropriate magnitude to adjust the receiver sensitivity, a sensitivity adjusting part including two resistors and one switching element has been known up to now (see, for example, Japanese Patent Application Laid-open No. 2008-248831). The sensitivity adjustment part switches the switching element to select any resistor through which the ion current signal is to be transmitted so as to convert the magnitude of the ion current signal for adjustment of the receiver sensitivity.

In the sensitivity adjustment part of the related art, unless the switching element normally operates, the receiver sensitivity of the ion current signal cannot be adjusted. For that reason, there is conceivably a case where, even if the receiver sensitivity of the ion current signal is intended to be adjusted by the signal processing device, the receiver sensitivity is not actually adjusted, and as a result, appropriate signal processing cannot be executed. Under the circumstances, there is a need to diagnose whether or not the switching element of the sensitivity adjustment part normally operates to adjust the receiver sensitivity of the ion current signal to a desired sensitivity. That is, there is a need to diagnose whether or not the sensitivity adjustment part is in failure.

As a measure for diagnosing whether or not the sensitivity adjustment part is in failure, there has been generally known a measure for inputting a known signal to the sensitivity adjustment part at a specific timing, and confirming whether or not a signal output from the sensitivity adjustment part reaches to a desired value. However, this measure cannot be applied to the signal processing device that always executes signal processing. That is, there arises such a problem that this measure cannot be applied to the signal processing device that cannot take timing at which the known signal is input to the sensitivity adjustment part, that is, that cannot perform interruption for failure diagnosis processing.

SUMMARY OF THE INVENTION

The present invention has been made to solve the above-mentioned problems, and therefore an object of the present invention is to provide a failure diagnosis system that can diagnose whether or not a sensitivity adjustment part for adjusting a receiver sensitivity of an input signal is in failure, even in a signal processing device that always executes signal processing.

A failure diagnosis system of the present invention includes: a plurality of sensors of the same type that are disposed under the same environments; an operating condition detection part that detects an operating condition of a device to be detected; a plurality of sensitivity adjustment parts that are disposed in correspondence with the plurality of sensors, and adjust receiver sensitivities of sensor signals output from the plurality of sensors based on the detected operating condition to output adjusted sensor signals; and a failure diagnosis part that diagnoses whether or not the plurality of sensitivity adjustment parts are in failure, in which the failure diagnosis part detects a failure condition of a sensitivity adjustment part to be diagnosed when a difference between a comparison value calculated based on a maximum value of the adjusted sensor signals output from the plurality of sensitivity adjustment parts at a given interval, and a maximum value of the adjusted sensor signal output from the sensitivity adjustment part to be diagnosed at the given interval is larger than a given amount.

According to the failure diagnosis system of the present invention, the failure diagnosis part detects the failure condition of the sensitivity adjustment part to be diagnosed when the difference between the comparison value calculated based on the maximum value of the adjusted sensor signals output from the plurality of sensitivity adjustment parts at the given interval, and the maximum value of the adjusted sensor signal output from the sensitivity adjustment part to be diagnosed at the given interval is larger than the given amount.

For that reason, there can be obtained the failure diagnosis system that can diagnose whether or not the sensitivity adjustment part for adjusting the receiver sensitivity of the input signal is in failure, even in the signal processing device that always executes the signal processing.

DETAILED DESCRIPTION OF THE PREFERRED EMBODIMENT

Hereinafter, a failure diagnosis system according to a preferred embodiment of the present invention is described with reference to the accompanying drawings. In the respective drawings, identical or corresponding parts are denoted by the same symbols for description. Described in the following embodiment is a case in which the failure diagnosis system diagnoses whether or not a sensitivity adjustment part for adjusting a receiver sensitivity of an ion current signal from an ion sensor disposed in each cylinder of an internal combustion engine is in failure. However, the present invention is not limited to this configuration, but the failure diagnosis system may diagnose whether or not the sensitivity adjustment part for adjusting the receiver sensitivity of a knock signal from a knock sensor or a cylinder internal pressure signal from a cylinder internal pressure sensor, which are disposed in each cylinder, is in failure.

First Embodiment

Figure 1:
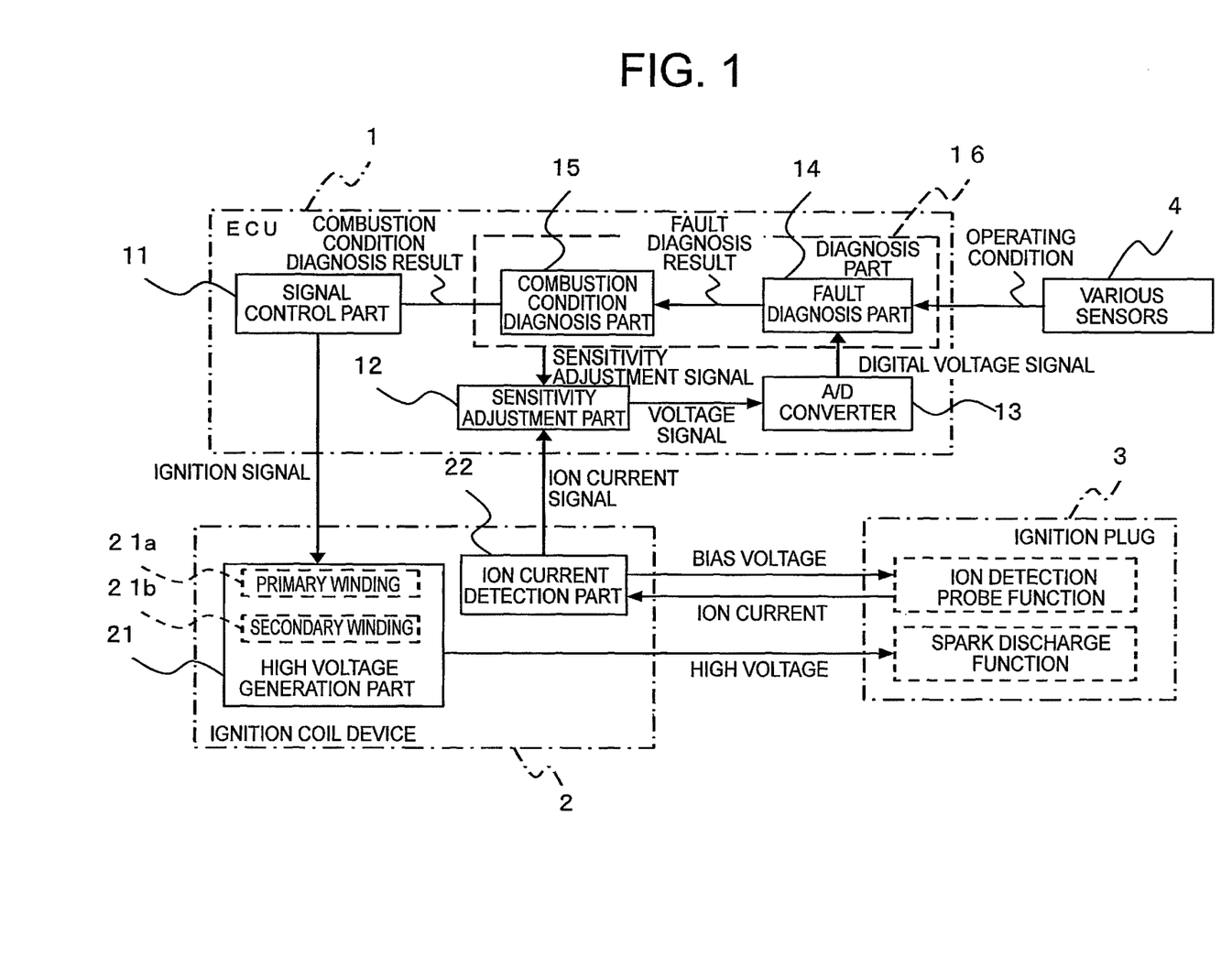
FIG. 1 is a block diagram illustrating a configuration of an ignition control device for an internal combustion engine including a failure diagnosis system according to a first embodiment of the present invention.

FIG. 1 is a block diagram illustrating a configuration of an ignition control device for an internal combustion engine including a failure diagnosis system according to a first embodiment of the present invention. Referring to FIG. 1, the ignition control device for the internal combustion engine includes an engine control unit 1 (hereinafter abbreviated as "ECU 1"), an ignition coil device 2, an ignition plug 3 (ignition device), and various sensors 4 (operating condition detection section). The ignition coil device 2 and the ignition plug 3 are disposed in each cylinder of the internal combustion engine, but one ignition coil device 2 and one ignition plug 3 are illustrated in FIG. 1.

The ECU 1 is a control unit that manages input/output of various signals, and includes a signal control part 11, a sensitivity adjustment part 12, an A/D converter 13, a failure diagnosis part 14, and a combustion condition diagnosis part 15 (signal processing part). The sensitivity adjustment part 12 and the A/D converter 13 are disposed in each cylinder of the internal combustion engine in correspondence with the ignition coil device 2 and the ignition plug 3. However, one sensitivity adjustment part 12 and one A/D converter 13 are illustrated in FIG. 1.

In this example, the signal control part 11, the failure diagnosis part 14, and the combustion condition diagnosis part 15 each include a microprocessor (not shown) having a central processing unit (CPU) and a memory that stores a program therein. Each of those blocks is stored as software in the memory. The failure diagnosis part 14 and the combustion condition diagnosis part 15 are collectively called "diagnosis part 16".

The ignition coil device 2 is connected to the ECU 1 and the ignition plug 3, and applies a high voltage for generating spark discharge to the ignition plug 3. Further, the ignition coil device 2 applies a bias voltage for detecting an ion current to the ignition plug 3, and outputs the detected ion current to the ECU 1. The ignition coil device 2 includes a high voltage generation part 21 having a primary winding 21a and a secondary winding 21b, and an ion current detection part 22 (sensor).

The ignition plug 3 is disposed in each cylinder of the internal combustion engine, and has a spark discharge function of generating the spark discharge for igniting a combustible gas mixture within each combustion chamber. Further, the ignition plug 3 has an ion detection probe function of detecting ions generated by combustion of the combustible gas mixture, and outputting the ions as an ion current. The various sensors 4 are connected to the ECU 1, and detect the operating conditions (rotating speed, load, etc.) of the internal combustion engine to output the detected operating conditions to the ECU 1.

Hereinafter, the functions of the respective parts of the ignition control device for the internal combustion engine, which are configured as described above, are described.

The signal control part 11 generates an ignition signal which is an instruction signal for operating the ignition coil device 2 based on the combustion condition diagnosis results, which are described later, from the combustion condition diagnosis part 15, and the operating conditions of the internal combustion engine, which have been detected by the various sensors 4. The signal control part 11 then outputs the ignition signal to the high voltage generation part 21. The high voltage generation part 21 develops a high voltage according to the ignition signal from the signal control part 11, and applies the high voltage to the ignition plug 3.

Specifically, when the ignition signal becomes high, a primary current starts to flow in the primary winding 21a having one end connected to a battery (not shown), and the high voltage generation part 21 starts to store an energy. Subsequently, at an ignition timing when the ignition signal switches from high to low, the primary current is interrupted, and a high voltage of, for example, about 30 kV is developed through mutual induction in the secondary winding 21b having one end connected to the ignition plug 3.

The ignition plug 3 generates the spark discharge due to breakdown between an electrode of the ignition plug 3 and a ground (GND) according to a high voltage applied from the high voltage generation part 21, and induces the ignition and combustion of the combustible gas mixture within the combustion chamber. In this situation, the ion current detection part 22 generates a bias voltage (for example, constant voltage of about 100 V) for detecting ions generated by combustion of the combustible gas mixture with the spark discharge, and applies the bias voltage to the ignition plug 3 after completion of the spark discharge.

The ignition plug 3 detects the ions generated by combustion of the combustible gas mixture by applying the bias voltage between the electrode and the ground. The ignition plug 3 then outputs the detected ions as the ion current to the ion current detection part 22. The ion current detection part 22 detects the ion current output from the ignition plug 3, and after amplifying the current, outputs the amplified ion current to the sensitivity adjustment part 12 as the ion current signal (sensor signal).

The sensitivity adjustment part 12 converts the ion current signal from the ion current detection part 22 into an appropriate magnitude to adjust the receiver sensitivity. In the first embodiment of the present invention, the sensitivity adjustment part 12 converts the ion current signal, which is a current signal, into a voltage signal, and also controls the conversion rate to convert the magnitude of the ion current signal. The A/D converter 13 (A/D converts) the voltage signal (adjusted sensor signal) from the sensitivity adjustment part 12 into a digital signal from an analog signal to output a digital voltage signal to the failure diagnosis part 14.

Figure 2:
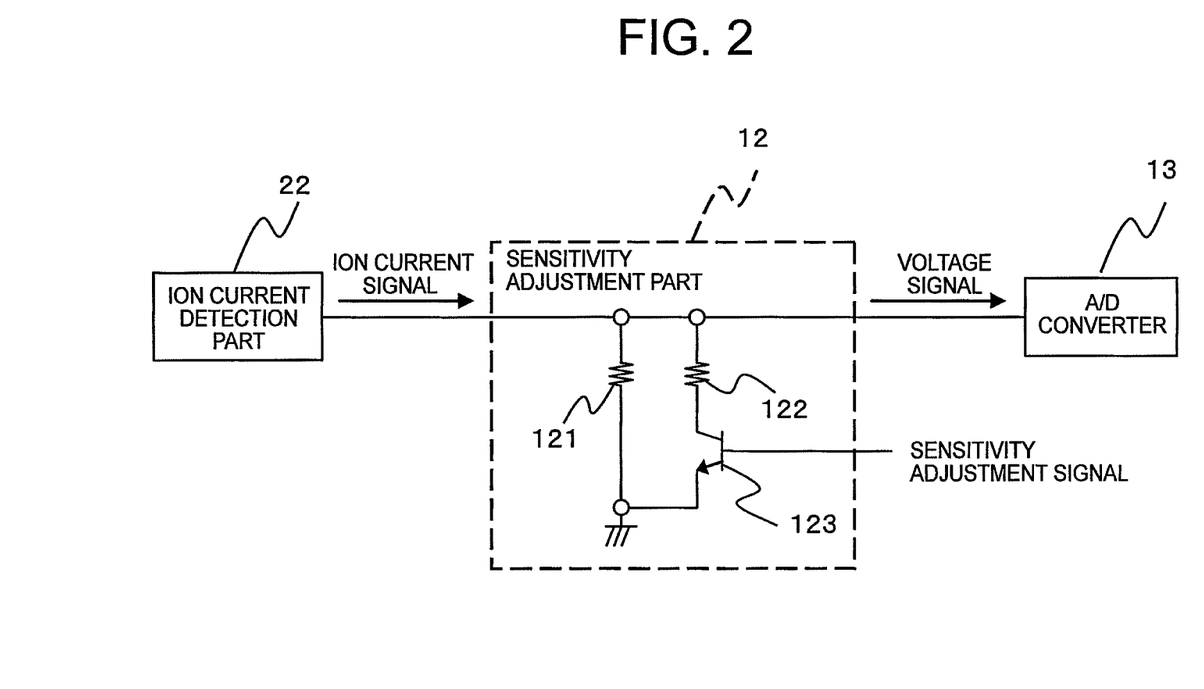
FIG. 2 is a block diagram illustrating a circuit configuration of a sensitivity adjustment part in the failure diagnosis system according to the first embodiment of the present invention, together with an ion current detection part and an A/D converter.

FIG. 2 is a block diagram illustrating a circuit configuration of the sensitivity adjustment part 12 in the failure diagnosis system according to the first embodiment of the present invention, together with the ion current detection part 22 and the A/D converter 13. Referring to FIG. 2, the sensitivity adjustment part 12 includes two resistors 121 and 122 having the respective one ends connected in parallel to the input, and a transistor 123 having a collector connected to the other end of the resistor 122. The other end of the resistor 121 and the emitter of the transistor 123 are grounded. Further, the transistor 123 is used as a switching element that turns on/off according to a sensitivity adjustment signal, which is described later, that is input to the base from the diagnosis part 16.

When the transistor 123 is off, that is, when the base potential of the transistor 123 is low, the ion current signal flows in the ground (GND) through the resistor 121. On the contrary, when the transistor 123 is on, that is, when the base potential of the transistor 123 is high, the ion current signal flows in the ground (GND) through the resistor 121, and the resistor 122 and the transistor 123.

For example, it is assumed that a current value of the ion current signal from the ion current detection part 22 is 1 mA, the respective resistance values of the resistors 121 and 122 are 4 kΩ and 1 kΩ, and a collector-emitter voltage Vice during the operation of the transistor 123 is 0.1 V. In this case, when the transistor 123 is off, a voltage value of the voltage signal output to the A/D converter 13 is 4 V. When the transistor 123 is on, the voltage value of the voltage signal output to the A/D converter 13 is 0.88 V. Accordingly, a value read by the A/D converter 13 can be changed with respect to the same ion current signal, and the receiver sensitivity of the ion current signal is adjusted.

When the dynamic range of the A/D converter 13 is 0 to 5 V, the sensitivity adjustment part 12 needs to convert the ion current signal into an appropriate voltage signal of 0 to 5 V for the purpose of preventing a signal component to be truncated when the voltage signal is subjected to A/D conversion from occurring. Further, for example, when the internal combustion engine rotates at a high speed, the ion current is known to be increased. For that reason, whether or not the maximum value of the voltage value is liable to exceed 5 V in converting the ion current signal into the voltage signal can be known in association with the rotating speed of the internal combustion engine through experiments in advance.

Consequently, when the internal combustion engine rotates at the high speed (the rotating speed is higher than a given rotating speed), the diagnosis part 16 outputs the sensitivity adjustment signal so that the base potential of the transistor 123 becomes high, based on the rotating speed of the internal combustion engine, which has been detected by the various sensors 4. Thus, the diagnosis part 16 adjusts the sensitivity of the sensitivity adjustment part 12 to be lowered. Further, when the internal combustion engine does not rotate at the high speed (the rotating speed is equal to or lower than the given rotating speed), the diagnosis part 16 outputs the sensitivity adjustment signal so that the base potential of the transistor 123 becomes low. Thus, the diagnosis part 16 adjusts the sensitivity of the sensitivity adjustment part 12 to be enhanced.

The diagnosis part 16 may output the sensitivity adjustment signal for controlling the on/off state of the transistor 123 based on a load of the internal combustion engine, which has been detected by the various sensors 4. Thus, the conversion rate when converting the ion current signal into the voltage signal is changed with the use of the experimental results obtained in advance, based on the operating conditions (rotating speed, load, etc.) of the internal combustion engine. As a result, in the A/D converter 13, the signal component to be truncated when the voltage signal is subjected to A/D conversion can be prevented from occurring, to thereby appropriately read the voltage value of the voltage signal.

Returning to FIG. 1, the failure diagnosis part 14 diagnoses, with the use of the digital voltage signal from the A/D converter 13, whether or not the sensitivity adjustment part 12 has appropriately adjusted the receiver sensitivity of the ion current signal to a desired sensitivity, that is, whether or not the sensitivity adjustment part 12 is in failure. The failure diagnosis part 14 then outputs the failure diagnosis results to the combustion condition diagnosis part 15.

The failure diagnosing method for the failure diagnosis part 14 is described in detail later. For example, the failure diagnosis part 14 detects the failure condition of the sensitivity adjustment part 12 to be diagnosed when a difference between the comparison value calculated based on the maximum value of the respective adjusted sensor signals output from the plurality of sensitivity adjustment parts 12 at a given interval, and the maximum value of the adjusted sensor signal output from the sensitivity adjustment part 12 to be diagnosed at the given interval is larger than a given amount, or when a condition where the difference is larger than the given amount occurs by a given frequency or more.

When the sensitivity adjustment part 12 is not in failure in each of the cylinders, and the failure diagnosis results from the failure diagnosis part 14 show "good", the combustion condition diagnosis part 15 diagnoses the combustion condition with the use of the digital voltage signal output from the A/D converter 13 as it is. The combustion condition diagnosis part 15 then outputs the combustion condition diagnosis results to the signal control part 11. In this situation, the signal control part 11 controls various actuators based on the combustion condition diagnosis results from the combustion condition diagnosis part 15, and executes feedback control and closed loop control so that the combustion condition becomes optimum.

On the other hand, when the failure diagnosis results from the failure diagnosis part 14 show that the receiver sensitivity of the ion current signal has not been adjusted in a specific cylinder as intended, and it is determined that the sensitivity adjustment part 12 is in failure, the combustion condition diagnosis part 15 stops the diagnosis of the combustion condition, and outputs this fact to the signal control part 11 as the combustion condition diagnosis results. In this situation, the signal control part 11 prohibits the feedback control and the closed loop control of the various actuators, and switches the control to open loop control to control the internal combustion engine.

When the failure diagnosis part 14 diagnoses that the receiver sensitivity of the ion current signal has not been adjusted in a part of the cylinders as intended, the failure diagnosis part 14 may correct the digital voltage signal related to that cylinder to an appropriate digital value. Because the failure diagnosis part 14 diagnoses whether or not the receiver sensitivity of the ion current signal has been adjusted to the desired known sensitivity, the input digital voltage signal can be converted into a signal having a desired sensitivity in a software fashion.

In this case, the failure diagnosis part 14 outputs the failure diagnosis results showing "abnormality" to the combustion condition diagnosis part 15, while outputting the corrected digital voltage signal to the combustion condition diagnosis part 15. The combustion condition diagnosis part 15 diagnoses the combustion condition with the use of the corrected digital voltage signal as it is. As a result, the feedback control and the closed loop control by the signal control part 11 are continued.

However, because correction of the digital voltage signal is intended to correct data that has been digitally dispersed, detailed information is absent conceivably. Accordingly, in this case, a flag indicating that the reliability of data is deteriorated is hoisted with the result that determination of whether or not the corrected digital voltage signal is used can be left to processing at a post-stage.

The operation of the failure diagnosis part 14 in the failure diagnosis system according to the first embodiment of the present invention is described next with reference to a flowchart of FIG. 3. The failure diagnosis part 14 diagnoses whether or not the sensitivity adjustment part 12 is in failure, based on a parameter indicative of the level of a signal such as the maximum value of the digital voltage signal. A case in which the number of cylinders is four is described.

First, the failure diagnosis part 14 determines whether or not the conditions under which the failure diagnosis processing can be executed are satisfied (Step S1).

For example, when a fuel is being cut off, multiple ignitions are being implemented, a signal path is disconnected, a transient condition is being continued, a leak path exists between the electrode of the ignition plug 3 and the ground (GND), or ignition is being cut off, the execution condition is not satisfied, and the failure diagnosis processing is not executed as described later.

When it is determined that the execution condition is satisfied (that is, yes) in Step S1, the failure diagnosis part 14 converts the digital voltage signal from the A/D converter 13 into the digital current signal with the use of the conversion rate set in the sensitivity adjustment part 12. The failure diagnosis part 14 also removes a noise component from the digital current signal with the use of a low-pass filter, etc. (step S2).

Then, the failure diagnosis part 14 obtains a current maximum value A at an interval P from an ignition timing of the ignition plug 3 until a given period of time has elapsed in the digital current signal obtained in Step S2 (Step S3).

Figure 4:
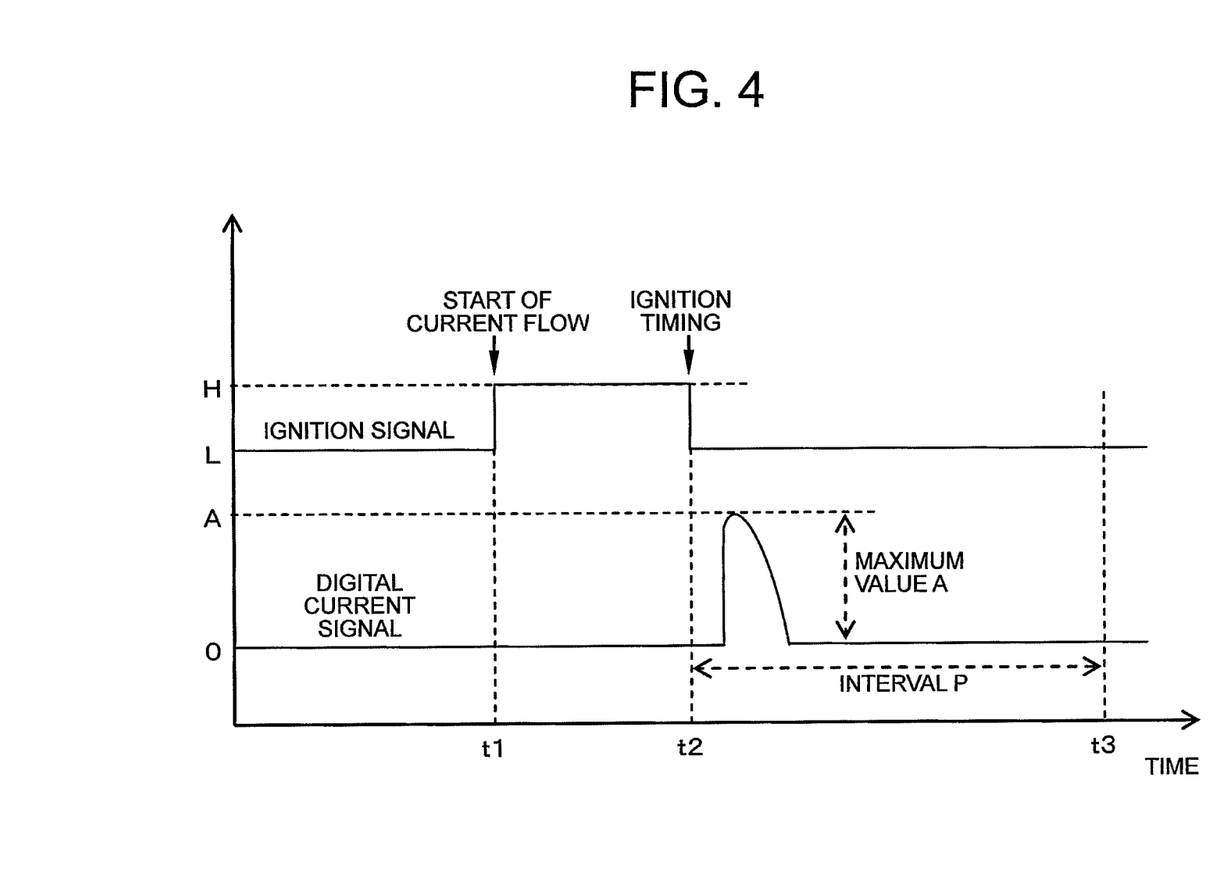
FIG. 4 is a timing chart showing an ignition signal and a digital current signal in the failure diagnosis system according to the first embodiment of the present invention.

Referring to a timing chart of FIG. 4, processing of the failure diagnosis part 14 in Step S3 is described in detail. Referring to FIG. 4, the axis of abscissa represents a time. An upper stage of FIG. 4 represents the ignition signal that is input to the high voltage generation part 21 from the signal control part 11, and a lower stage thereof represents the digital current signal obtained in Step S2.

As described above, when the ignition signal becomes high (H) (time t1), the primary current starts to flow in the primary winding 21a. Then, the primary current is interrupted at an ignition timing (time t2) when the ignition signal switches from high to low (L), and a high voltage is developed in the secondary winding 21b. Subsequently, the ion current indicated by the digital current signal is generated by combustion of the combustible gas mixture due to the spark discharge of the ignition plug 3 using the high voltage.

In this situation, the failure diagnosis part 14 obtains the current maximum value A of the digital current signal at the interval P (time t3-t2) from the ignition timing (time t2) until the given period of time has elapsed (time t3). It is preferred that the interval P be stored in a memory of the microprocessor as a map value corresponding to the operating conditions (rotating speed, load, etc.) of the internal combustion engine.

Returning to FIG. 3, the failure diagnosis part 14 then executes averaging and smoothing processing on the current maximum value A obtained in each cylinder, for each ignition event, and calculates a smoothed value B (Step S4).

Specifically, the failure diagnosis part 14 executes the smoothing processing as represented by the following Expression (1), for example, by using a moving average. In Expression (1), $B_{[cyl]n}$ represents the smoothed value B of a certain cylinder in the ignition event at a time n. Further, $\alpha$ expects a value of about 0.9.

$$B_{[cyl]n} = B_{[cyl]n-1} \times \alpha + A \times (1-\alpha) \tag{1}$$

Then, the failure diagnosis part 14 compares, in the respective cylinders, the smoothed values B obtained in the ignition event at the time n, selects a median value of the smoothed values B in the respective cylinders in the ignition event at the time n as represented by the following Expression (2), and stores the selected median value as a comparison value C (Step S5). In Expression (2), $C_n$ represents the comparison value C in the ignition event at the time n. Further, $B_{[cyl1 \sim cyl4]n}$ collectively represents the smoothed values B of the respective cylinders in the ignition event at the time n.

$$C_n = \mathrm{median}(B_{[cyl1 \sim cyl4]n}) \tag{2}$$

For example, in the ignition event at the time n, when the smoothed value B obtained from a first cylinder is $B_{[cyl1]n}=100$ μA, the smoothed value B obtained from a second cylinder is $B_{[cyl2]n}=30$ μA, the smoothed value B obtained from a third cylinder is $B_{[cyl3]n}=101$ μA, and the smoothed value B obtained from a fourth cylinder is $B_{[cyl4]n}=102$ μA, the comparison value C is $C_n=100$ μA.

Then, in order to diagnose whether or not the sensitivity adjustment part 12 is in failure, the failure diagnosis part 14 determines whether or not a value resulting from multiplying the smoothed value B ($B_{[cyl]n}$) of a certain cylinder in the ignition event at the time n by a coefficient D, which is described later, is larger than the comparison value C ($C_n$) in the ignition event at the time n (Step S6).

In Step S6, when it is determined that the value resulting from multiplying the smoothed value B by the coefficient D is larger than the comparison value C (that is, yes), in order to diagnose whether or not the sensitivity adjustment part 12 is in failure, the failure diagnosis part 14 determines whether or not the smoothed value B ($B_{[cyl]n}$) of the certain cylinder in the ignition event at the time n is smaller than a value resulting from multiplying the comparison value C ($C_n$) in the ignition event at the time n by the coefficient D (Step S7).

In this example, it is desired that the coefficient D be determined according to the conversion rate set by the sensitivity adjustment part 12. For example, in the example of the sensitivity adjustment part 12 illustrated in FIG. 2, a side higher in receiver sensitivity is different in magnitude of the ion current signal by about 4 times from a side lower in receiver sensitivity. Therefore, it is preferred that the coefficient D be set to 2 that is about half the difference. Further, a variation of the smoothed value B is different according to the operating condition of the internal combustion engine. Therefore, in order to prevent the erroneous determination due to the difference in variation, the coefficient D may be stored in a memory of the microprocessor as a variable determined according to the operating condition (rotating speed, load, etc.) of the internal combustion engine, or a map value.

In Step S7, when it is determined that the smoothed value B is smaller than the value resulting from multiplying the comparison value C by the coefficient D (that is, yes), the failure diagnosis part 14 determines that the possibility that the sensitivity adjustment part 12 of the cylinder is in failure is low, and subtracts 1 from a value of a counter CNT of the cylinder in the ignition event at the time n, as represented by the following Expression (3) (Step S8). In Expression (3), $CNT_{[cyl]n}$ represents the value of the counter CNT of the cylinder in the ignition event at the time n.

$$CNT_{[cyl]n} = CNT_{[cyl]n-1} - 1 \quad (3)$$

On the other hand, when it is determined in Step S6 that the value resulting from multiplying the smoothed value B by the coefficient D is equal to or smaller than the comparison value C (that is, no), or when it is determined in Step S7 that the smoothed value B is equal to or larger than the value resulting from multiplying the comparison value C by the coefficient D (that is, no), the failure diagnosis part 14 determines that there is a possibility that the sensitivity adjustment part 12 of the cylinder is in failure, and adds 2 to the value of the counter CNT of the cylinder in the ignition event at the time n as represented by the following Expression (4) (Step S9).

$$CNT_{[cyl]n} = CNT_{[cyl]n-1} + 2 \quad (4)$$

In this example, the counter CNT is disposed in each cylinder of the internal combustion engine. The counter CNT counts up when there is a possibility that the sensitivity adjustment part 12 of the cylinder is in failure, and counts down when the possibility that the sensitivity adjustment part 12 of the cylinder is in failure is low.

Subsequently, the failure diagnosis part 14 clips the value of the counter CNT subtracted in Step S8 or added in Step S9 by given upper and lower limits E (Step S10).

Specifically, the failure diagnosis part 14 clips the value of the counter CNT by a lower limit of 0 and an upper limit of 10, for example. In this case, when the upper limit of the clip is large, it is difficult to return to a condition (normal condition) where it is diagnosed that the sensitivity adjustment part 12 of the cylinder is not in failure, which is a safer setting.

It is preferred that the amount of count-up and the amount of count-down of the counter CNT can be set to different amounts. In the first embodiment of the present invention, the failure diagnosis part 14 sets the amount of count-up to 2 and the amount of count-down to 1, as represented in Step S8 or Step S9. As a result, hysteresis is so set as to easily diagnose that the sensitivity adjustment part 12 of the cylinder is in failure, and make it difficult to return to the normal condition.

Further, the amount of count-up and the amount of count-down, or the upper and lower limits of the clip may be stored in a memory of the microprocessor as variables determined according to the operating condition (rotating speed, load, etc.) of the internal combustion engine, or map values.

Then, in order to finally diagnose whether or not the sensitivity adjustment part 12 of the cylinder is in failure, the failure diagnosis part 14 determines whether or not the value of the counter CNT ($CNT_{[cyl]n}$) of the cylinder in the ignition event at the time n, which has been clipped in Step S10, is larger than a comparison value F which is arbitrarily set (Step S11).

In the first embodiment of the present invention, the comparison value F is set to a value of about 5 for facilitation of understanding. However, the comparison value F may be stored in a memory of the microprocessor as a variable determined according to the operating condition (rotating speed, load, etc.) of the internal combustion engine, or a map value.

Figure 3:
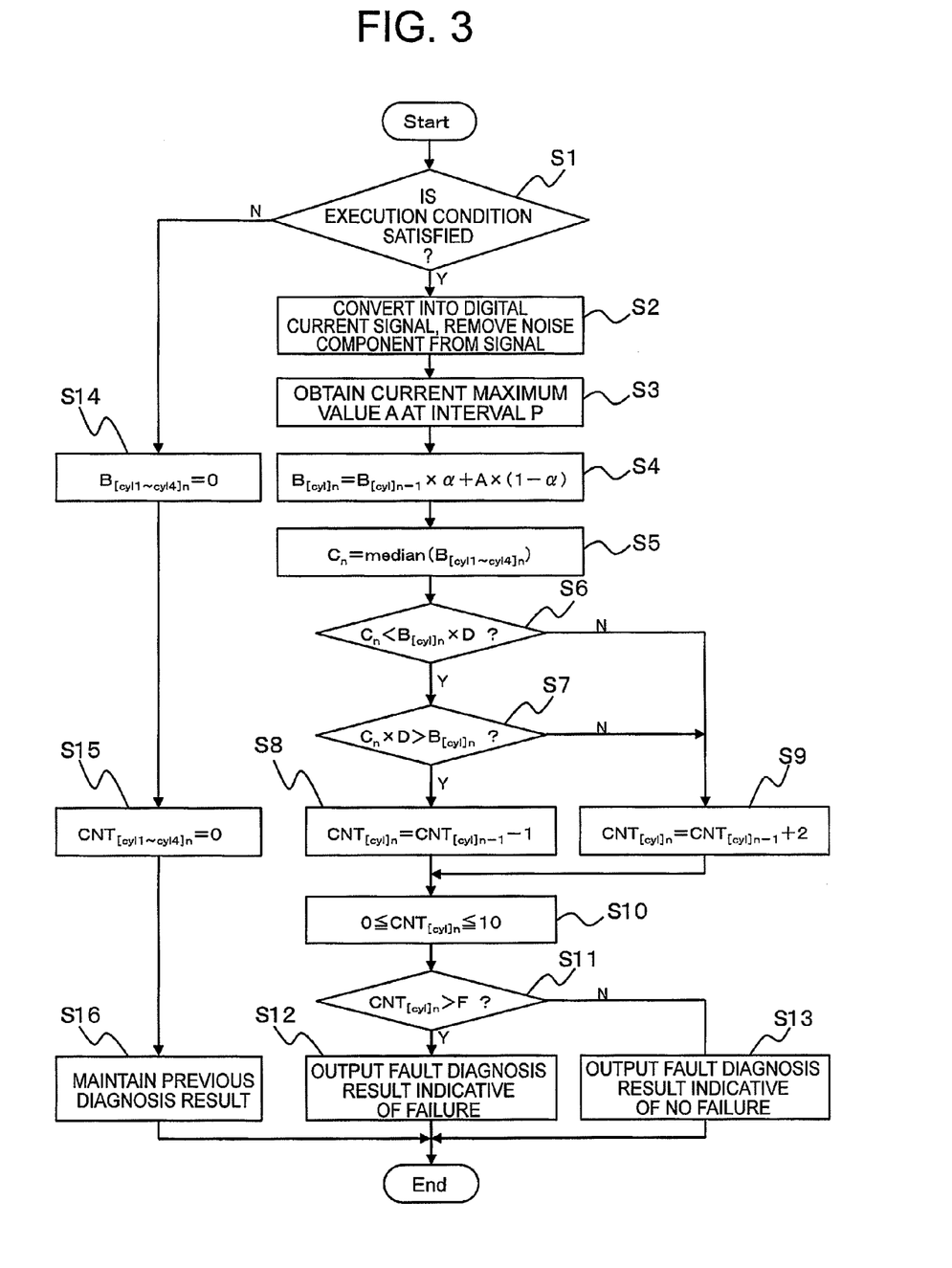
FIG. 3 is a flowchart illustrating an operation of a failure diagnosis part in the failure diagnosis system according to the first embodiment of the present invention.

In Step S11, when it is determined that the value of the counter CNT is larger than the comparison value F (that is, yes), the failure diagnosis part 14 diagnoses that the sensitivity adjustment part 12 of the cylinder is in failure, that is, that the receiver sensitivity of the ion current signal is not adjusted as intended, outputs this fact as the failure diagnosis result (Step S12), and terminates the processing of FIG. 3.

On the other hand, in Step S11, when it is determined that the value of the counter CNT is equal to or smaller than the comparison value F (that is, no), the failure diagnosis part 14 diagnoses that the sensitivity adjustment part 12 of the cylinder is not in failure, outputs this fact as the failure diagnosis result (Step S13), and terminates the processing of FIG. 3.

On the other hand, in Step S1, when it is determined that the execution condition is not satisfied (that is, no), the failure diagnosis part 14 sets the smoothed value B ($B_{[cyl1-cyl4]n}$) of each cylinder in the ignition event at the time n to 0 (Step S14).

Then, the failure diagnosis part 14 sets the value of the counter CNT ($CNT_{[cyl1-cyl4]n}$) of each cylinder in the ignition event at the time n to 0 (Step S15), maintains the previous diagnosis result (Step S16), and terminates the processing of FIG. 3.

Figure 5:
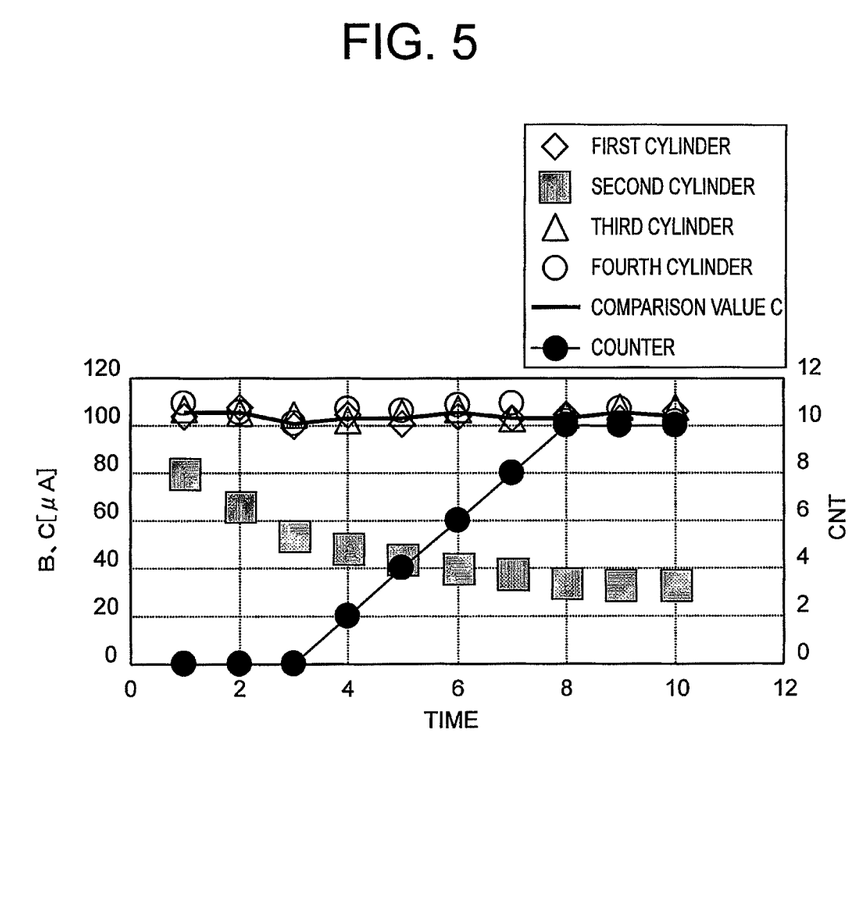
FIG. 5 is a trend graph showing failure diagnosis results in the failure diagnosis system according to the first embodiment of the present invention.

Processing in Steps S4 to S12 of FIG. 3 is described next in detail with reference to a trend graph of FIG. 5. Referring to FIG. 5, the following case is described. That is, there is described a case where a failure that the sensitivity of the sensitivity adjustment part 12 of the second cylinder is unintendedly deteriorated occurs, that is, a case where, in the example of the sensitivity adjustment part 12 illustrated in FIG. 2, although the sensitivity adjustment signal that makes a base potential of the transistor 123 low is output, the failure that the base potential becomes high occurs.

The axis of abscissa in FIG. 5 represents a time when each ignition event occurs. The left axis of ordinate represents the smoothed values B of the respective cylinders in the ignition event at each time, and the comparison value C which is the median value of the smoothed values B of the respective cylinders at each time. The right axis of ordinate represents the value of the counter CNT of the second cylinder in the ignition event at each time.

Referring to FIG. 5, it is assumed that a failure occurs in the sensitivity adjustment part 12 of the second cylinder at a time 0. It is found that the smoothed value B ($B_{[cyl2]}$) of the second cylinder is gradually away from the smoothed values B ($B_{[cyl1, 3, 4]}$) of the other cylinders from that time. Sequentially, at a time 3, the smoothed values B of the respective cylinders become $B_{[cyl1, 2, 3, 4]3}$=[100 μA, 54 μA, 104 μA, 101 μA] (Step S4), and the comparison value C becomes $C_3$=101 μA (Step S5).

In this situation, in Step S6 of FIG. 3, when the coefficient D is D=2, 101<54×2 is satisfied. Therefore, the determination is yes, and the processing is advanced to Step S7. Then, in Step S7, because 101×2>54 is satisfied, the determination is yes, and the processing is advanced to Step S8. Then, in Step S8, the value of the counter CNT is reduced by 1. However, because the lower limit of the counter CNT is clipped by 0 in Step S10, the value of the counter CNT of the second cylinder at the time 3 becomes $CNT_3$=0.

The time is advanced, and at a time 4, the smoothed values B of the respective cylinders become $B_{[cyl1, 2, 3, 4]4}$=[104 μA, 48 μA, 102 μA, 107 μA] (Step S4), and the comparison value C becomes $C_4$=103 μA (Step S5). In this situation, in Step S6 of FIG. 3, when the coefficient D is D=2, 103>48×2 is satisfied. Therefore, the determination is no, the processing is advanced to Step S9, and 2 is added to the value of the counter CNT. The value of the counter CNT of the second cylinder at the time 4 becomes $CNT_4$=2. Hereinafter, the value of the counter CNT of the second cylinder is increased in the same manner.

In this example, when the comparison value F for failure diagnosis is set to F=5, the determination in Step S11 at a time 6 becomes yes, and the processing is advanced to Step S12. The failure diagnosis part 14 diagnoses that the sensitivity adjustment part 12 of the second cylinder is in failure, and can output this fact as the failure diagnosis result.

As described above, according to the first embodiment of the present invention, the failure diagnosis part detects the failure condition of the sensitivity adjustment part to be diagnosed when the difference between the comparison value calculated based on the maximum value of the respective adjusted sensor signals output from the plurality of sensitivity adjustment parts at a given interval, and the maximum value of the adjusted sensor signal output from the sensitivity adjustment part to be diagnosed at the given interval is larger than the given amount.

For that reason, there can be obtained the failure diagnosis system that can diagnose whether or not the sensitivity adjustment part for adjusting the receiver sensitivity of the input signal is in failure, even in the signal processing device that always executes the signal processing.

Further, because whether or not the receiver sensitivity of the input signal is appropriately adjusted can be diagnosed, appropriate treatment can be executed based on the diagnosis result.

Further, the failure diagnosis system according to the first embodiment of the present invention is mounted on an automobile, a motor cycle, an outboard engine, or other special machines, each using the internal combustion engine, and can reliably diagnose whether or not the sensitivity adjustment part is in failure. Therefore, the failure diagnosis system can efficiently operate the internal combustion engine, and can help the environmental protection and the problem about fuel depletion.

What is claimed is:

1. A failure diagnosis system, comprising:
   a plurality of sensors of the same type that are disposed under the same environments;
   an operating condition detection part that detects an operating condition of a device to be detected;
   a plurality of sensitivity adjustment parts that are disposed in correspondence with the plurality of sensors, and adjust receiver sensitivities of sensor signals output from the plurality of sensors based on the detected operating condition to output adjusted sensor signals; and
   a failure diagnosis part that diagnoses whether or not the plurality of sensitivity adjustment parts are in failure,
   wherein the failure diagnosis part detects a failure condition of a sensitivity adjustment part to be diagnosed when a difference between a comparison value calculated based on a maximum value of the adjusted sensor signals output from the plurality of sensitivity adjustment parts at a given interval, and a maximum value of the adjusted sensor signal output from the sensitivity adjustment part to be diagnosed at the given interval is larger than a given amount.

2. A failure diagnosis system according to claim 1,
   wherein the plurality of sensors each comprise an ion sensor that is disposed in each cylinder of the internal combustion engine, and detects ions generated by combustion of a combustible gas mixture within each combustion chamber.

3. A failure diagnosis system according to claim 1,
   wherein the failure diagnosis part avoids executing failure diagnosis processing when the failure diagnosis part determines that the failure diagnosis processing for the sensitivity adjustment part to be diagnosed is difficult.

4. A failure diagnosis system according to claim 1,
   further comprising a signal processing part that processes the adjusted sensor signal to obtain desired information,
   wherein the signal processing part stops processing of the adjusted sensor signal when the failure diagnosis part diagnoses that a part of the plurality of sensitivity adjustment parts is in failure.

5. A failure diagnosis system according to claim 1,
   further comprising a signal processing part that processes the adjusted sensor signal to obtain desired information,
   wherein the failure diagnosis part generates a corrected sensor signal resulting from correcting the adjusted sensor signal to output the corrected sensor signal to the signal processing part when the failure diagnosis part diagnoses that a part of the plurality of sensitivity adjustment parts is in failure, and
   wherein the signal processing part processes the corrected sensor signal to obtain desired information.

6. A failure diagnosis system according to claim 1,
   wherein the failure diagnosis part detects the failure condition of the sensitivity adjustment part to be diagnosed when a condition where the difference between the comparison value and the maximum value of the adjusted sensor signal output from the sensitivity adjustment part to be diagnosed at the given interval is larger than the given amount occurs by a given frequency or more.

7. A failure diagnosis system according to claim 1,
   wherein the operating condition detection part comprises an operating condition detection part that detects the operating condition of an internal combustion engine disposed in a vehicle, and
   wherein the operating condition comprises at least one of a rotating speed and a load of the internal combustion engine.

8. A failure diagnosis system according to claim 7,
   wherein the plurality of sensors each comprise an ion sensor that is disposed in each cylinder of the internal combustion engine, and detects ions generated by combustion of a combustible gas mixture within each combustion chamber.

9. A failure diagnosis system according to claim 7,
   wherein the failure diagnosis part avoids executing failure diagnosis processing when the failure diagnosis part determines that the failure diagnosis processing for the sensitivity adjustment part to be diagnosed is difficult.

10. A failure diagnosis system according to claim 2,
    further comprising a signal processing part that processes the adjusted sensor signal to obtain desired information,
    wherein the signal processing part stops processing of the adjusted sensor signal when the failure diagnosis part diagnoses that a part of the plurality of sensitivity adjustment parts is in failure.

11. A failure diagnosis system according to claim 7,
    further comprising a signal processing part that processes the adjusted sensor signal to obtain desired information,
    wherein the failure diagnosis part generates a corrected sensor signal resulting from correcting the adjusted sensor signal to output the corrected sensor signal to the signal processing part when the failure diagnosis part diagnoses that a part of the plurality of sensitivity adjustment parts is in failure, and
    wherein the signal processing part processes the corrected sensor signal to obtain desired information.

12. A failure diagnosis system according to claim 7,
    wherein the failure diagnosis part detects the failure condition of the sensitivity adjustment part to be diagnosed when a condition where the difference between the comparison value and the maximum value of the adjusted sensor signal output from the sensitivity adjustment part to be diagnosed at the given interval is larger than the given amount occurs by a given frequency or more.

* * * * *